(12) United States Patent
Wettroth et al.

(10) Patent No.: US 6,567,878 B2
(45) Date of Patent: *May 20, 2003

(54) TWO WIRE MIXED SIGNAL BI-DIRECTIONAL BUS INTERFACE

(75) Inventors: John M. Wettroth, Apex, NC (US); Charles M. Allen, Sunnyvale; Michael A. Ashburn, Jr., Mountain View, both of CA (US)

(73) Assignee: Maxim Integrated Products, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,871

(22) Filed: May 17, 1999

(65) Prior Publication Data

US 2002/0010820 A1 Jan. 24, 2002

(51) Int. Cl.[7] .............................................. G06F 13/00
(52) U.S. Cl. ..................... 710/305; 710/306; 710/58; 710/62; 710/240
(58) Field of Search ................. 710/129, 128, 710/126, 58, 61, 62, 240, 305, 306, 307

(56) References Cited

U.S. PATENT DOCUMENTS

| | | | | |
|---|---|---|---|---|
| 4,376,995 A | * | 3/1983 | Shimizu | 368/107 |
| 4,419,758 A | * | 12/1983 | Dorey | 375/260 |
| 4,810,958 A | * | 3/1989 | Takao et al. | |
| 5,404,460 A | * | 4/1995 | Thomsen et al. | 710/9 |
| 5,524,269 A | * | 6/1996 | Hamilton et al. | |
| 5,557,672 A | * | 9/1996 | Perry et al. | 379/399 |
| 5,715,475 A | * | 2/1998 | Munson et al. | 710/10 |
| 5,914,957 A | * | 6/1999 | Dean et al. | 370/438 |
| 5,948,092 A | * | 9/1999 | Crump | 710/129 |

* cited by examiner

Primary Examiner—Ario Etienne
(74) Attorney, Agent, or Firm—Perkins Coie LLP

(57) ABSTRACT

A bus interface is provided including a first bus transmission medium adapted for being connected to a control signal source which generates a plurality of sequential control signals. During use, the first bus transmission medium serves to communicate the sequential control signals. Associated with the first bus transmission medium is a second bus transmission medium that is in communication with at least one peripheral device. Such device generates an output signal on the second bus transmission medium upon actuation. Tracking circuitry is connected to the device and remains in communication with the first bus transmission medium. By this interconnection, the tracking circuitry is capable of actuating the device upon the receipt of at least one of the sequential control signals that is associated with the device and is distinguishable by a unique sequential order amongst the remaining sequential control signals.

19 Claims, 4 Drawing Sheets

TWO WIRE MIXED SIGNAL BI-DIRECTIONAL BUS INTERFACE

DESCRIPTION

1. Technical Field

The present invention relates to bus interfaces and more particularly pertains to a two wire mixed signal bi-directional bus interface for transmitting both analog and digital signals on a simplistic bus interface that requires less die area overhead and is expandable to accommodate a large number of devices of a variety in nature.

2. Background Art

Bus interfaces are commonly used in various electronic applications to allow communication between a controlling mechanism such as a microprocessor, and a plurality of peripheral parts, or devices. Prior Art FIG. 1 shows an example of a bus interface 100 of the prior art. As shown, the bus interface includes a microprocessor 102, a first bus 104, a second bus 106, and a plurality of peripheral devices 108.

As is conventional, the microprocessor 102 communicates with the devices 108 via the first and second buses 104 and 106 using an associated bus protocol. This bus protocol comprises a set of rules for delivering and receiving information on the bus interface. Specifically, the microprocessor 102, in accordance with the bus protocol, may "activate" or select one of the devices by identifying the same with an associated address. This is accomplished by transmitting a digital binary code to each of the devices 108 via the first bus 104. If the binary code matches the address of one of the devices 108, such device 108 is "activated". Once "activated", communication between the microprocessor 102 and the selected device 108 may ensue to the extent of accomplishing a task. For example, the device 108 may deliver the microprocessor 102 digital information by way of the second bus 106.

Prior art bus interfaces like the one shown in Prior Art FIG. 1 are conventionally used to pass only one type of signal, i.e. analog or digital. By passing only one type of signal, such bus interfaces are limited to working with only analog peripheral devices or digital peripheral devices.

Further, prior art bus interfaces are very complex in nature. This complexity translates into a large die area on the associated integrated circuit on which the system is built. For example, for complex protocols such as J2C and SMB, such die area would be prohibitively large. There is thus a need for a simpler bus protocol that may be more easily implemented on a smaller die area.

There is thus a need for a bus interface capable of transmitting both analog and digital signals on a simplistic bus interface that requires less die area overhead and is expandable to accommodate a large number of devices of a variety in nature.

DISCLOSURE OF THE INVENTION

The present invention comprises a bus interface including a first bus transmission medium adapted for being connected to a control signal source which generates a plurality of sequential control signals. During use, the first bus transmission medium serves to communicate the sequential control signals. Associated with the first bus transmission medium is a second bus transmission medium that is in communication with at least one peripheral device. Such device generates an output signal on the second bus transmission medium upon actuation. Tracking circuitry is connected to the device and remains in communication with the first bus transmission medium. Through this interconnection, the tracking circuitry is capable of actuating the device upon the receipt of at least one of the sequential control signals that is associated with the device and is distinguishable by a unique sequential order amongst the remaining sequential control signals.

By this design, a more simple bus protocol is provided that is not only more easily understood, but also more easily implemented on a smaller die area. Such simplicity also permits the bus interface of the present invention to be conveniently expanded to accommodate a large number of peripheral devices of a variety in nature. In addition to the foregoing benefits, the present invention also allows the communication of both analog and digital signals between a controlling mechanism and peripheral devices.

BRIEF DESCRIPTION OF THE DRAWINGS

The invention will be better understood when consideration is given to the following detailed description thereof. Such description makes reference to the annexed drawings wherein:

Prior Art

FIG. 2b is a timing diagram delineating a suitable method of the present invention used to actuate the single device of FIG. 2a.

FIG. 3b is a timing diagram delineating one possible method of the present invention used to actuate the devices of FIG. 3a.

BEST MODES FOR CARRYING OUT THE INVENTION

The present invention includes a bus interface and associated protocol that transmits both analog and digital signals, requires less die area overhead, and is expandable to accommodate a large number of devices of a variety in nature.

Figure 1:
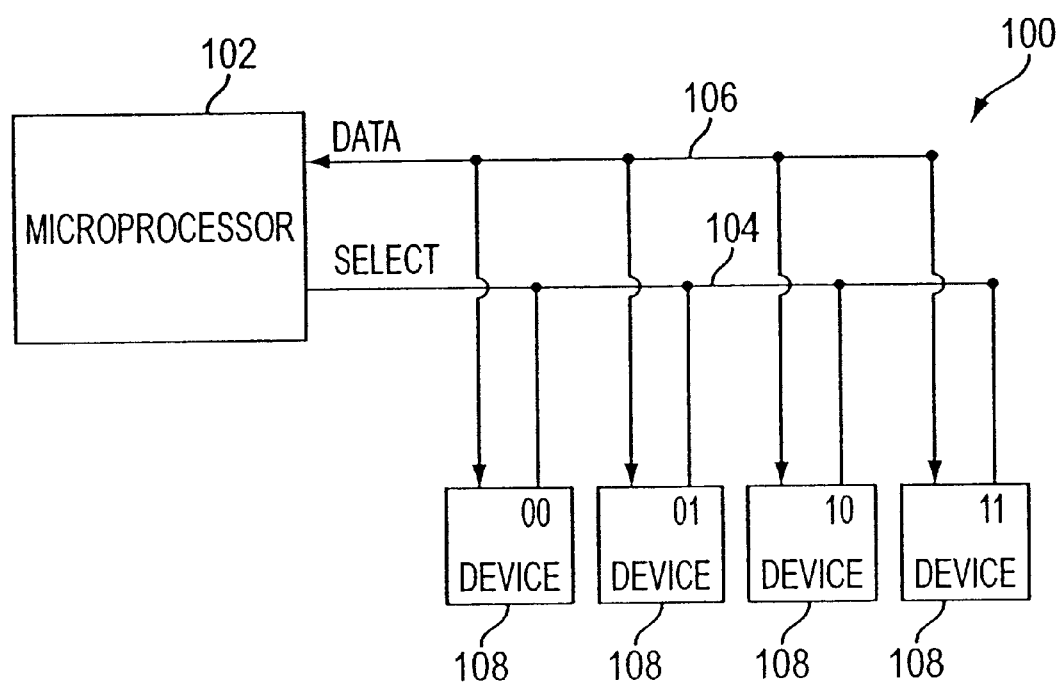
FIG. 1 is an illustration of a bus interface of the prior art.
Figure 2A:
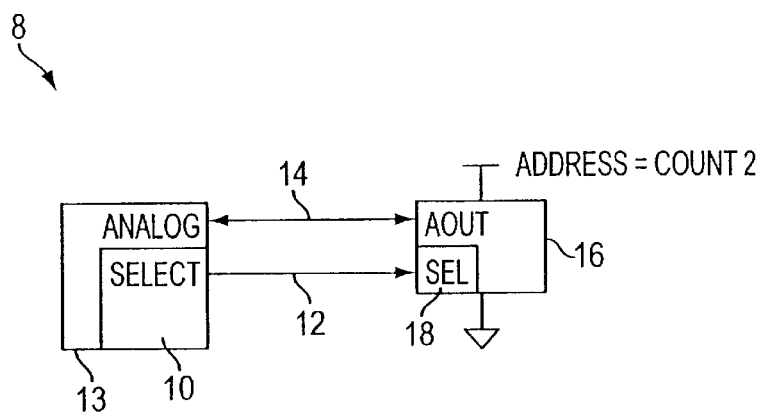
FIG. 2a is an illustration of one embodiment of the present invention with the incorporation of a single device to be controlled.
Figure 2B:
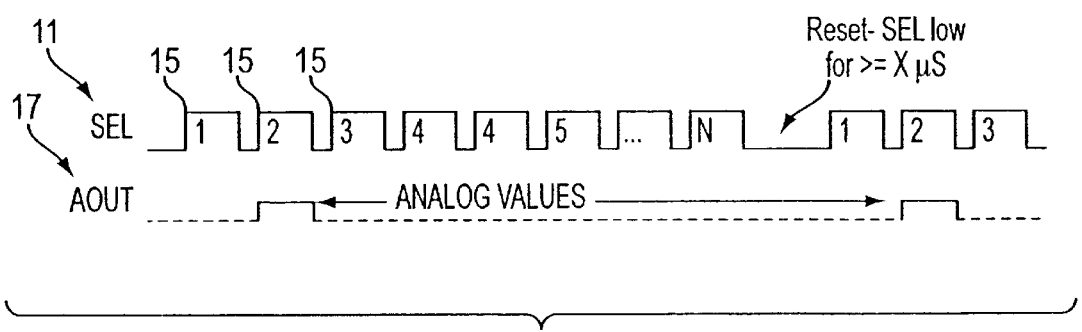

As shown in FIGS. 2a and 2b, a bus interface 8 in accordance with a first embodiment of the present invention includes a control signal source 10, a controlling mechanism 13, first and second bus transmission mediums 12 and 14, at least one peripheral device 16, and tracking circuitry 18. The control signal source 10 is provided for generating a plurality of sequential control signals 11 and may comprise a stand-alone unit, or be connected to or integral with a microprocessor or any other type of controlling mechanism 13. See FIGS. 2a and 3a. For reasons that will become apparent hereinafter, the sequential control signals 11 include a continuous stream of consecutive pulses 15 each distinguishable by a unique order amongst the remaining sequential control signals 11. The sequential control signals are thus similar to a clock signal. Note the sequential control signals shown in FIG. 2b and described below.

The first bus transmission medium 12 is connected to the control signal source 10 for communicating the sequential control signals 11. The second bus transmission medium 14 is connected between the controlling mechanism 13 and the device 16 which carries out a task upon the actuation thereof. Such task may take any form including, but not limited to the detection of a condition, the reading of data in the form of an analog or digital signal, or the transmission of an analog or digital output signal 17 on the second bus transmission medium 14. Accordingly, the device 16 may take on any form including, but not limited to a multiplexer, a latch, a register, an analog to digital converter, a digital to analog converter, or a sensor such as a temperature sensor or the like. In order to accommodate an analog signal from one of the devices via the second bus transmission medium 14, the controlling mechanism 13 may be equipped with an analog to digital converter.

In one embodiment, the present invention includes a single device 16, as shown in FIG. 2a. In other embodiments, however, a plurality of devices 16 may be connected to the first and second bus transmission mediums 12 and 14. Note FIG. 3a. When a plurality of devices 16 are utilized, it is important that the same do not interfere with each other while not actuated. As such, each of the devices 16 is adapted to tri-state the output thereof while not actuated, as indicated by the dotted lines in FIGS. 2b, 3b and 4b.

It should be noted that the connection between the control signal source 10, the controlling mechanism 13, the device 16, and the first and second transmission mediums 12 and 14 may be accomplished in any manner insofar as communication is afforded therebetween. To that end, any type of transmission medium may be employed whether it be a conductive line, a fiber optic line, free space or the like.

Figure 3A:
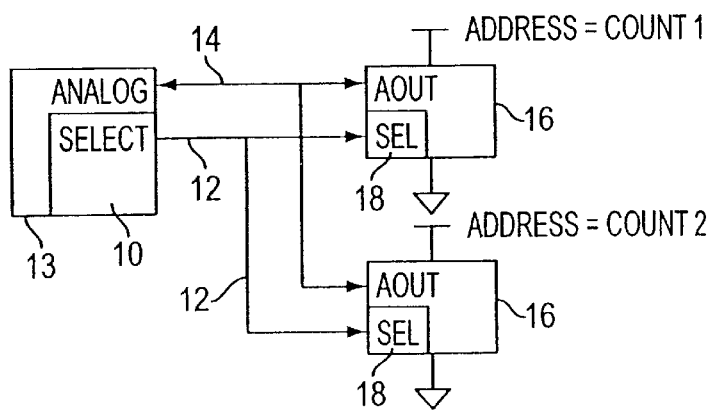
FIG. 3a is an illustration of the present invention with the incorporation of a plurality of devices to be controlled.

Next provided is the tracking circuitry 18 that may comprise a stand alone unit, or be connected to or integral with the device(s) 16, as shown in FIGS. 2a and 3a. In the case where multiple devices 16 are used, the devices 16 each may have dedicated tracking circuitry 18 associated therewith or, in the alternative, a single tracking circuit may service a plurality of devices 16. In still yet another embodiment, the tracking circuitry 18 may be incorporated with the control signal source 10 or controlling mechanism 13. In any of the foregoing embodiments, the various components of the present invention may comprise of any combination of discrete and/or integrated circuits.

Figure 3B:
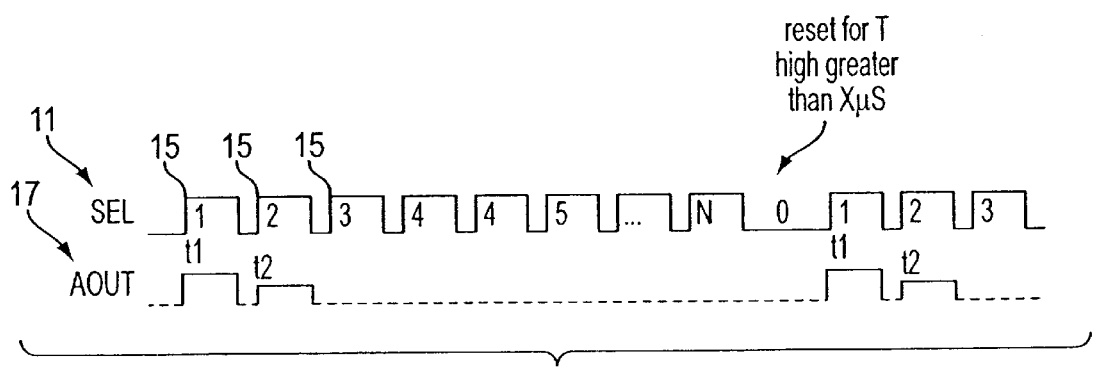

FIGS. 2b and 3b show examples of the manner in which the tracking circuitry 18 controls the associated device(s) 16, respectively. In use, the tracking circuitry 18 serves for actuating the appropriate device 16 upon the receipt of at least one of the sequential control signals 11 that is associated with, or assigned to, the device 16. Each sequential control signal is both identifiable and distinguishable by a unique sequential order of the sequential control signal amongst the remaining sequential control signals 11. By this design, each of the devices 16 that is in communication with the first bus transmission medium 12 may be actuated upon the receipt of the corresponding sequential control signal. During use, actuation of the devices 16 may begin at the rising edge of the associated sequential control signal and last the entire duration of the associated sequential control signal. These details relating to the actuation of the device are shown in FIG. 2b.

Selection of the sequential control signal that is to be associated with, or assigned to, each device 16 may be accomplished in a variety of ways. For example, the sequential control signal that is associated with the device 16 may be fixed or "built in" to the tracking circuitry 18. In the alternative, such sequential control signal may be programmable or continuously controlled by any mechanism including a plurality of digital selection pins or the like associated with the tracking circuitry 18. It should be noted that the number of sequential control signals 11 associated with each device 16 need not be limited to one. For example, a plurality of consecutive or non-consecutive sequential control signals 11 may be associated with, or assigned to, a device 16 during the receipt of which the tracking circuitry 18 actuates the device 16. This feature is particularly beneficial for devices such as analog to digital converters which may output on the second bus transmission medium 14 a string of bits that is representative of an analog signal.

Once each of the devices 16 has been actuated by the corresponding sequential control signals 11, there then becomes a need to "reset" the bus interface 10 in order to allow the subsequent actuation of the devices 16. In one embodiment, the bus interface 10 is "reset" after a predetermined number of the sequential control signals 11 has been generated. Such predetermined number, of course, must be at least the number of devices 16 which are utilized. In the present description, "reset" thus refers to the tracking circuitry 18 restarting the count after the predetermined number of sequential control signals has been generated. The present "wrap-around" embodiment is well suited for certain applications yet when a system is updated to include a number of devices 16 which exceeds the predetermined number of sequential control signals, more ingenuity is required.

Yet another method is offered wherein the bus interface 10 is "reset" upon an "anomaly" within the sequential control signals 11 being generated by the control signal source 10. While such "anomaly" may take on any form, it may also include a time period between the sequential control signals 11 which is greater than a predetermined amount of time. This predetermined time period may, for example, exceed the average duration of each of the sequential control signals 11. In the present embodiment, the tracking circuitry 18 is prompted by the "anomaly" to restart the counting of the sequential control signals 11. By this design, addition and removal of multiple devices 16 may be accommodated by mere adjustment of the placement of the "anomaly".

Just as each of the devices 16 may be "enabled" by ensuring that each device 16 has a sequential control signal assigned thereto, any one of the devices 16 may also be "disabled" by either one of two methods. A first method entails "resetting" the bus interface 10 prior to the generation of the sequential control signal associated with a device 16. In the alternative, any device 16 may be "disabled" by simply not selecting a sequential control signal to be assigned thereto. "Disabling" a device 16 is particularly advantageous if the device 16 includes a pull-up resistor and current conservation is desired.

Figure 4A:
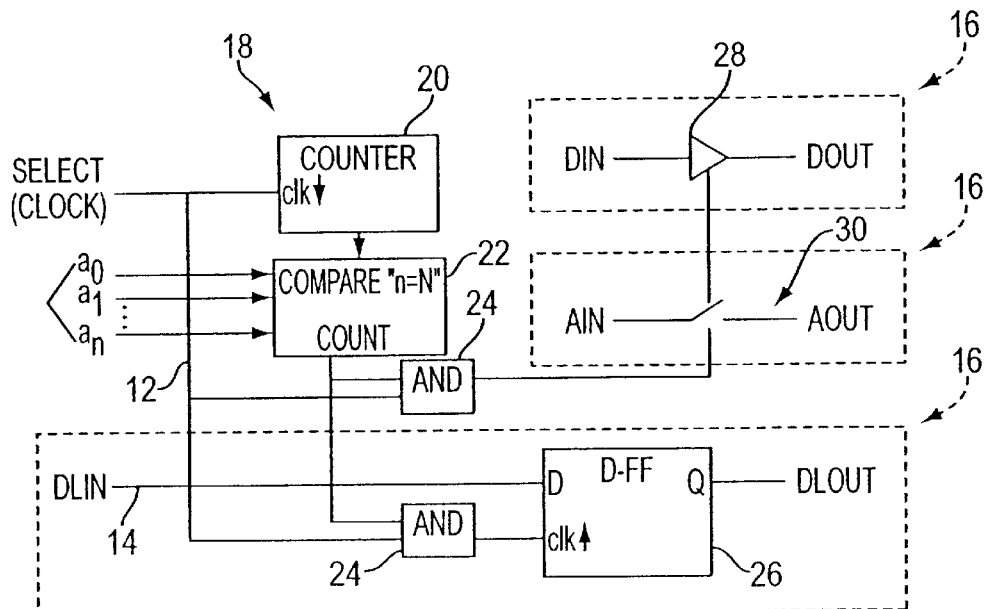
FIG. 4a is an illustration of yet another embodiment of the present invention.
Figure 4B:
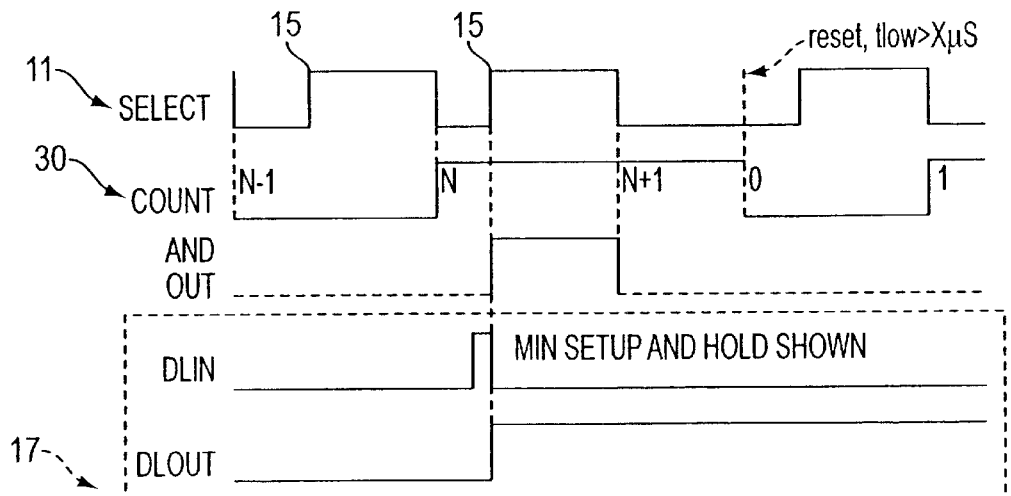
FIG. 4b is a timing diagram delineating one possible method of the present invention used to actuate the devices of the embodiment of FIG. 4a including the D flip-flop.

With reference now to FIGS. 4a and 4b, one implementation of the present invention will be set forth. As shown, the tracking circuitry 18 includes a counter 20 for incrementing between sequential states upon the receipt of each of the sequential control signals 11. In simple terms, the counter 20 counts each of the sequential control signals 11. Connected to the counter 20 is a comparator 22 for comparing a current state n of the counter 20 with a state N associated with the device 16. Upon the current state n of the counter 20 matching the state N associated with the device 16, the tracking circuitry 18 actuates the device 16.

To accomplish this, the tracking circuitry 18 includes an AND gate 24 connected between the comparator 22, the control signal source and the device 16. In use, the AND gate 24 actuates the device 16 only during the simultaneous receipt of one of the sequential control signals 11 in combination with the comparator 22 detecting the current state n of the counter 20 to match the state N associated with the device 16. While the current embodiment of the present invention may include any number of devices 16 of any type, FIG. 4a shows the incorporation of a D flip-flop 26, a digital multiplexer 28, and an analog multiplexer 30.

FIG. 4b is a timing diagram that depicts the operation of the embodiment shown in FIG. 4a. In the present embodiment, the devices 16 are to be actuated during the last of a plurality of sequential control signals. As shown, the sequential control signals 11 are inputted at a SELECT terminal and the comparator 22 of the tracking circuitry 18 generates an activation signal 30 at an output COUNT immediately after an appropriate number of the sequential control signals 11 has been counted. By this design, the activation signal 30 is pulsed during the last sequential control signal and further terminates when the sequential control signals 11 are "reset". Both the sequential control signals 11 and the activation signal 30 are inputted into the AND gates 24. To this end, the devices 16 are actuated for only the duration of the appropriate sequential control signal. In the case of the D flip-flop 26, the same is clocked at the rising edge of the appropriate sequential control signal, thereby transferring the current input D of the D flip-flop 26 to the output Q. Note FIG. 4b.

With reference now to Table 1, a specific implementation of the present invention will now be set forth. As indicated, a plurality of devices are provided which are connected to the bus interface 10 as described hereinabove. Each device is assigned a unique set of the sequential control signals referred to as an address in Table 1. It should be noted that the "0" address is not assigned in the present embodiment. Further, the devices each have a varying number of sequential control signals associated therewith meaning each is actuated a unique amount of time. Also shown is the nature, i.e. analog or digital, of the input of each device along with the nature of the output that is transmitted on the second transmission bus medium.

TABLE 1

| Device | Input | Output | Address |
| --- | --- | --- | --- |
| Temp Sensor | Temp | Analog | 1, 2, 3, 4 |
| Voltage Input | Analog | Analog | 5, 6 |
| Digital Input | Digital | Digital | 7, 8 |
| Digital Output | Digital | N/A | 9, 10, 11, 12 |
| Analog Output | Digital | N/A | 13/14, 15/16 |
| ADC 8 bit | Analog | Digital | 17–24, 25–32 |
| DAC 8 bit | Digital | Analog | 33–40, 41–48 |

Specifically, the temperature sensor and voltage input of the present embodiment serve for inputting a temperature and a voltage value, respectively, anywhere in a system. The digital input and output are included for inputting and outputting digital information. Similarly, the analog output is adapted for outputting analog data. To improve the efficiency of the system, the output devices may be assigned addresses that are higher than those of the input devices so as to ensure "short cycling". "Short cycling" refers to avoiding the "resetting" of the bus interface after input data has been received and before such input data has been outputted. In use, the digital output may be used to drive various output mechanisms such as a light emitting diode, fan, or the like. The analog output is incremented and decremented when a "1" and a "0" are received, respectively. As an option, the analog output may be assigned two addresses, as shown, so that the analog output may also be "passed", neither incremented or decremented. In use, the analog output may be used to adjust volume or controls within an application. Finally, the analog to digital and digital to analog converters work in a conventional manner. As mentioned earlier, those devices which have high addresses may be easily "disabled" by simply resetting the interface bus prior to the generation of the sequential control signals associated with the device.

As to the manner of usage and operation of the present invention, the same should be apparent from the above description. Accordingly, no further discussion relating to the manner of usage and operation will be provided.

Although only a few embodiments of the present invention have been described in detail herein, it should be understood that the present invention could be embodied in many other specific forms without departing from the spirit or scope of the invention.

Therefore, the present examples and embodiments are to be considered as illustrative and not restrictive, and the invention is not to be limited to the details given herein, but may be modified within the scope of the appended claims.

I claim:

1. A method for signaling a device from a control mechanism over a bus comprising:

providing a control mechanism;

pairing a control signal source with said control mechanism;

providing at least one peripheral device having a device id corresponding to a predefined number;

pairing a tracking circuit to said at least one peripheral device, said tracking circuit responsive to electrical pulses and capable of matching electrical pulses to said predefined number of said at least one peripheral device to which said tracking circuit is paired;

connecting said control signal source and said tracking circuit with a bus interface, said control mechanism operable to generate a series of pulse control signals across said bus interface with said control signal source, wherein said series of pulse control signals is a number of electrical pulses corresponding to at least one of said device ids;

sending a control signal from said control signal source along said bus interface to said tracking circuit, said control signal being said series of pulse control signals, wherein said control signal is intended to actuate a corresponding device of said at least one peripheral device, wherein said control signal may be fixed or programmable;

said tracking circuit determining whether said control signal corresponds to said device id by counting said series of pulses and comparing said predefined number with said counted pulses; and actuating said corresponding device of said at least one peripheral device when said tracking circuit receives said control signal and said control signal corresponds to said device id.

2. The method of signaling device from a control mechanism over a bus as in claim 1, wherein said tracking circuit resets during a pause in said series of pulses.

3. The method of signaling device from a control mechanism over a bus as in claim 1, wherein said tracking circuit resets after receiving an anomaly from said control signal.

4. The method of signaling device from a control mechanism over a bus as in claim 1, wherein said tracking circuit and said at least one peripheral device are a single unit.

5. The method of signaling device from a control mechanism over a bus as in claim 1, wherein a plurality of said tracking circuit is paired to a single at least one peripheral device.

6. The method of signaling device from a control mechanism over a bus as in claim 1, wherein said control mechanism and said control signal source are a single unit.

7. The method of signaling device from a control mechanism over a bus as in claim 1, wherein said bus may have at least one new peripheral device added to it.

8. The method of signaling device from a control mechanism over a bus as in claim 1, herein said at least one peripheral device is an analog to digital converter.

9. The method of signaling device from a control mechanism over a bus as in claim 1, wherein said at least one peripheral device is a digital to analog converter.

10. The method of signaling device from a control mechanism over a bus as in claim 1, wherein said peripheral device sends an analog signal to said control mechanism along a second bus when said peripheral device is actuated.

11. The method of signaling device from a control mechanism over a bus as in claim 1, wherein said control mechanism sends an analog signal to said peripheral device along a second bus when said peripheral device is actuated.

12. The method of signaling device from a control mechanism over a bus as in claim 1, wherein said tracking circuit includes a counter for incrementing between sequential states upon a receipt of each of said control signals, said tracking circuit further including a comparator for comparing a current state of said counter with a state associated with said at least one peripheral device, wherein said tracking circuit actuates said at least one peripheral device upon said current stated of said counter matching said state associated with at least one peripheral device.

13. The method of signaling device from a control mechanism over a bus as in claim 1, wherein said tracking circuit in includes an AND gate connected between said comparator, said control signal source and said at least one peripheral device for actuating said at least one peripheral device only during a simultaneous receipt of one of said control signals in combination with said comparator detecting said current state of said counter to match said state associated with said at least one peripheral device.

14. A control mechanism for signaling a device over a bus comprising:
a control mechanism;
a control signal source paired with said control mechanism;
at least one peripheral device;
a tracking circuit paired to said at least one peripheral device;
said control signal source connected to said tracking circuit with a bus interface;
a control signal sent from said control signal source along said bus interface to said tracking circuit, wherein said control signal may be fixed or programmable; and
said at least one peripheral device being actuated when said tracking circuit receives said control signal and said control signal corresponds to said tracking circuit;
wherein said control signal corresponds to said tracking circuit by said control signal being a series of pulses, and said tracking circuit counts said series of pulses, and matches said series of pulses to a predetermined number corresponding to said at least one peripheral device to which said tracking circuit is paired.

15. A two wire mixed signal bi-directional bus interface comprising:
a first bus capable of transmitting a digital signal;
a second bus capable of transmitting an analog signal;
a control mechanism;
a control signal source paired with said control mechanism, wherein said control signal may be fixed or programmable;
at least one peripheral device; and
one or more tracking circuit paired with each of said at least one peripheral device;
wherein a first digital signal is transmitted along said first bus from said control signal source to said tracking circuit;
wherein said tracking circuit identifies said first digital signal and actuates said at least one peripheral device that said tracking circuit is paired with when said first digital signal corresponds to said tracking circuit, wherein said first digital signal corresponds to said tracking circuit by said first digital signal being a series of pulses, and said tracking circuit counts said series of pulses, and matches said series of pulses to a predetermined number corresponding to said at least one peripheral device to which said tracking circuit is paired;
wherein said actuation of said at least one peripheral device allows said at least one peripheral device to do at least one of send a first analog signal to said control mechanism and receive a second analog signal from said control mechanism.

16. The two wire mixed signal bi-directional bus interface of claim 15, wherein said at least one peripheral device will tri-state said second analog signal while not actuated.

17. The two wire mixed signal bi-directional bus interface of claim 15, wherein said tracking circuit resets after said first digital signal is transmitted along said first bus.

18. The two wire mixed signal bi-directional bus interface of claim 15, wherein said interface is capable of having at least one new peripheral device added.

19. A method for two wire mixed signaling using a bi-directional bus interface comprising:
providing a first bus capable of transmitting a digital signal;
providing a second bus capable of transmitting an analog signal;
providing a control mechanism;
providing a control signal source paired with said control mechanism for sending and receiving control signals, wherein said control signals may be fixed or programmable and wherein said control signals correspond to a series of consecutive pulses each distinguishable by a unique order amongst the remaining sequential control signals;
providing at least one peripheral device; and
providing one or more tracking circuit paired with each of said at least one peripheral device wherein said tracking circuit counts said series of pulses, and matches said series of pulses to a predetermined number corresponding to said at least one peripheral device to which said tracking circuit is paired;
wherein a first digital signal is transmitted along said first bus from said control signal source to said tracking circuit;

wherein said tracking circuit identifies said first digital signal and actuates said at least one peripheral device that said tracking circuit is paired with;

wherein said actuation of said at least one peripheral device allows said at least one peripheral device to do at least one of send a first analog signal to said control mechanism and receive a second analog signal from said control mechanism.

* * * * *